United States Patent
Bender

[15] 3,670,744
[45] June 20, 1972

[54] SOLENOID OPERATED, TWO WAY DIVERTER VALVE FOR FLUID LINE WASHING APPARATUS

[72] Inventor: Lloyd F. Bender, Route 5, Hayward, Wis. 54843

[22] Filed: Jan. 11, 1971

[21] Appl. No.: 105,314

[52] U.S. Cl. ..............................134/57 R, 34/104, 134/104, 134/169, 137/561, 137/606
[51] Int. Cl. .........................................B08b 3/10, B08b 9/02
[58] Field of Search.....................134/166, 169, 57 R, 58 R; 137/561, 606

[56] References Cited

UNITED STATES PATENTS 3,500,839  3/1970  Bender..............................134/57 R

*Primary Examiner*—Edward L. Roberts
*Attorney*—James E. Nilles

[57] ABSTRACT

A washing apparatus including a fluid circuit for conducting a cleansing solution through conveying conduits, a drying means for blowing heated air through the conduits after they are cleaned, and improved, solenoid operated two way valves for selectively diverting the washing and drying fluids. An improved, solenoid operated, two way diverting valve for fluids.

3 Claims, 7 Drawing Figures

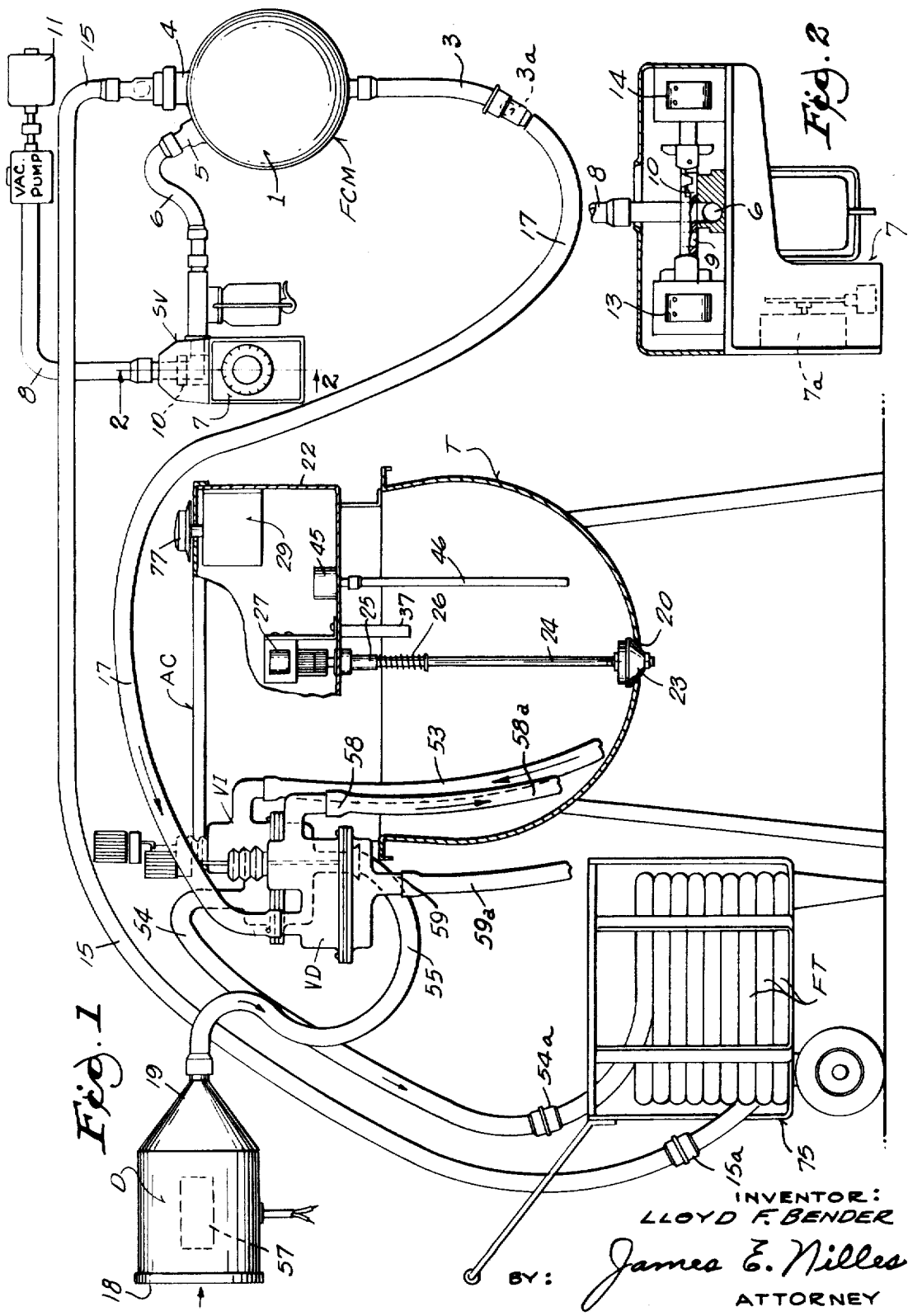

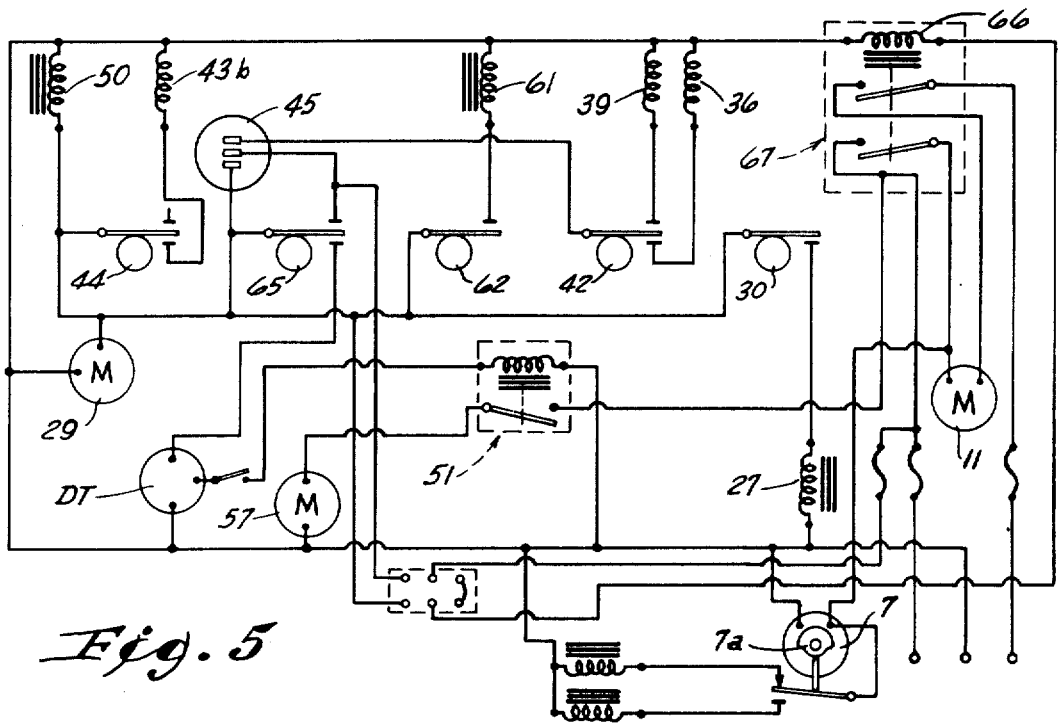

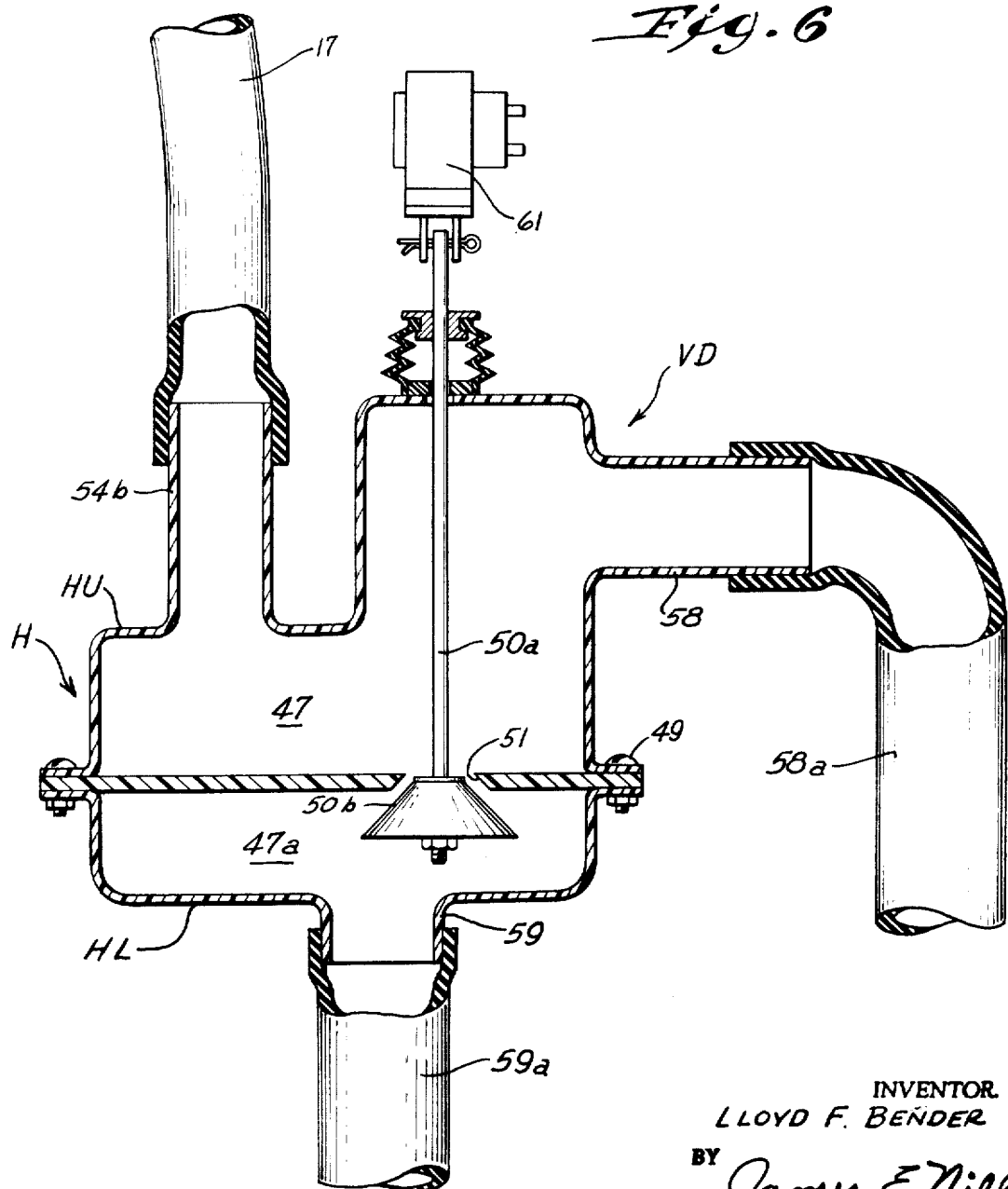

SOLENOID OPERATED, TWO WAY DIVERTER VALVE FOR FLUID LINE WASHING APPARATUS

BACKGROUND OF THE INVENTION

The present invention pertains generally to the cleaning of fluid conveying equipment and particularly to two way diverter valves which find particular utility when used in such systems.

An example of prior art valves used in such systems is shown in FIGS. 1 and 4 of my U.S. Pat. No. 3,500,839, issued Mar. 17, 1970, and entitled "Automated Washing System for Cleaning, Sanitizing and Drying Flexible Tubing or the Like."

SUMMARY OF THE INVENTION

The present invention provides an improved solenoid operated, two way diverter valve for various fluids, and which valve finds particular utility in combination with an automatic washing system for cleaning and drying flexible tubing of milk handling equipment or the like.

These and other objects and advantages of the present invention will appear hereinafter as this disclosure progresses, reference being had to the accompanying drawings.

BRIEF DESCRIPTION OF THE DRAWINGS

FIG. 1 is a schematic view of a washing system embodying the present invention, certain parts being shown as broken away or in section for clarity in the drawings;

FIG. 2 is a sectional view, taken along line 2—2 in FIG. 1, but on an enlarged scale, and showing the solenoid operated slide valve for the washer releaser;

FIG. 5 is an electrical wiring diagram used with the present invention;

FIG. 6 is a cross sectional view similar to FIG. 4 and showing the other two-way valve; and FIG. 7 is a chart showing the timer sequence.

DESCRIPTION OF A PREFERRED EMBODIMENT

Figure 3:
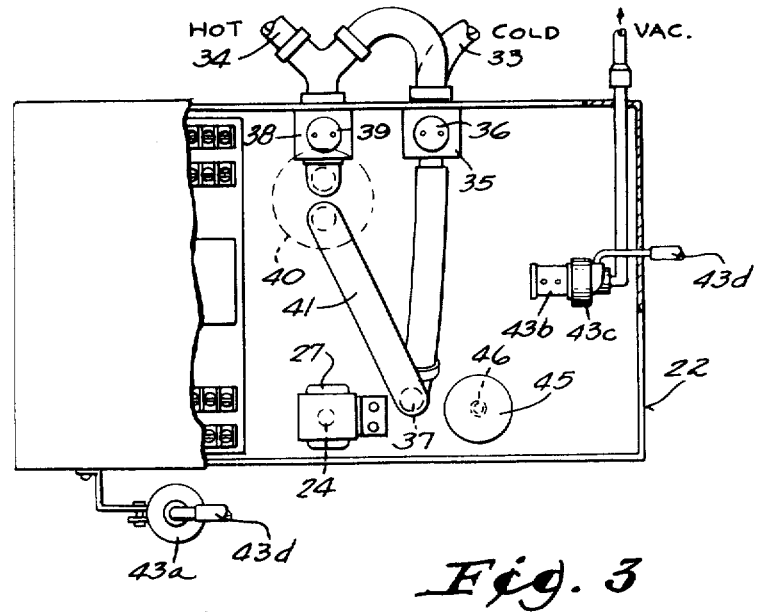
FIG. 3 is a plan view of the control box shown in FIG. 1, but on an enlarged scale, with certain parts shown as being broken away for clarity.

FIG. 1 shows the general organization of an arrangement using the invention and includes a fluid circulating means FCM which takes the form of an electrically timed washer-releaser; solution tank T for holding the clear water, washing solution or rinse solution, the electrical automatic control means AC, the air heating means such as an electric dryer D; the improved solenoid operated two way valves VI and VD, one valve being an intake valve VI and the other a discharge valve VD; and the flexible tubing FT which is to be completely cleaned and dried.

It will be appreciated that other forms of fluid circulating means such as a pressure pump (not shown) may also be used with the present invention.

FLUID CIRCULATING MEANS

Referring in greater detail to FIG. 1, the washer-releaser type of fluid circulating means FCM may be of the general type shown and described in my U.S. Pat. No. 3,273,514, issued Sept. 20, 1966. The washer-releaser would include the hollow vessel 1 of spherical shape and transparent material which has an integral fluid discharge conduit 3 extending downwardly from its lowermost side, and a one-way dump valve 3a, such as shown in my U.S. Pat. No. 3,352,248 of Nov. 14, 1967, for releasing fluid when the vessel is opened to atmosphere. The vessel has a fluid inlet 4 at its upper end and a vacuum conduit 5 adjacent its upper end and to which is attached by a conduit 6, a slide valve SV. The slide valve is electrically operated by a timer 7 driven by an electric motor 7a so as to alternately subject the vessel to a vacuum from conduit 8, or to the atmosphere via an opening 9 in the slide 10 of the valve. If a more complete description of the valve SV is deemed to be either necessary or desirable, reference may be had to the said U.S. Pat. No. 3,273,514. It is believed sufficient to say that a vacuum pump motor 11 provides the vacuum to which conduit 8 is attached. As the timer 7 causes either one of the solenoids 13 or 14 (FIGS. 2 and 5) to shift the slide in one direction or the other, either vacuum is drawn from the vessel 1 or alternatively, the vessel is opened to atmosphere. When the vessel is subjected to vacuum, it draws fluid from conduit 15 attached to its inlet 4, and when the vessel is opened to atmosphere, fluid is released via valve 3a and to the conduit 17 attached to the vessel discharge conduit 3.

Thus the washer-releaser FCM acts as a pump to draw fluid into the vessel and then release the fluid.

DRYER

The dryer D is an air heater and blower and may be of the type shown in U.S. Pat. No. 3,067,756, issued Dec. 11, 1962, and includes an electric motor which draws air in through its enlarged end 18 and forces the air, after it is heated, out of its restricted outlet 19.

TANK

The tank T includes a closeable drain 20 at its bottom and when the drain is closed, as will appear, the tank can hold either clear water, a washing solution, or a rinse solution. The tank is filled or emptied by the action of the electrically operated, automatic control means AC, to be described.

CONTROL MEANS

The box 22 for the control means AC is preferably mounted directly on the tank and houses some of the components shown in the electrical diagram of FIG. 5.

Drain closing means in the form of a drain stopper 23 is fixed on the lower end of a rod 24 which extends downwardly from the box 22. The rod 24 is vertically shiftable in a bushing 25 fixed on the bottom of box 22 and a spring 26 biases the rod downwardly to normally close the drain. An electric solenoid 27 is connected to the top end of rod 24 and is energized by a timer 29, via cam 30, to cause the rod and stopper to raise, thus opening the tank drain 20.

A pair of water hoses 33 and 34 are connectable to conventional spigots (not shown) of cold and hot water lines, respectively, for furnishing the necessary water. The water flows through lines 33 and 34 (FIG. 3), through a mixer valve 35 which is operated by a solenoid 36 and down a feeder tube 37 into the tank T.

The timer 29 also has a cam 42 (FIG. 5) causing actuation of the solenoid coils of the solenoids 36 or 39 (FIGS. 3 and 5). As will appear later, the timer is arranged so that the tank will first fill, for example, with water at about 95° temperature for the first rinse. The tank later fills with hot water including detergent and after that washing cycle, the tank is again filled with clear water for the final rinse during which a measured amount of acid, from a container (not shown) may be dispensed into the rinse solution. More specifically, the addition of the acid is regulated by cam 44 (FIG. 5) which actuates the solenoid coil 43b which in turn operates a vacuum valve 43c that admits vacuum via line 43d to pump 43a.

The level of the fluid in tank T is controlled by a normally closed pressure switch 45 which causes the closing of the solenoid operated water valve. The pressure switch 45 is activated by a predetermined level of the fluid in a pressure tube 46 which extends from the switch 45 down into the tank T, and the switch 45 thus regulates the water valves and consequently the flow of water into the tank.

TWO WAY VALVES

Figure 4:
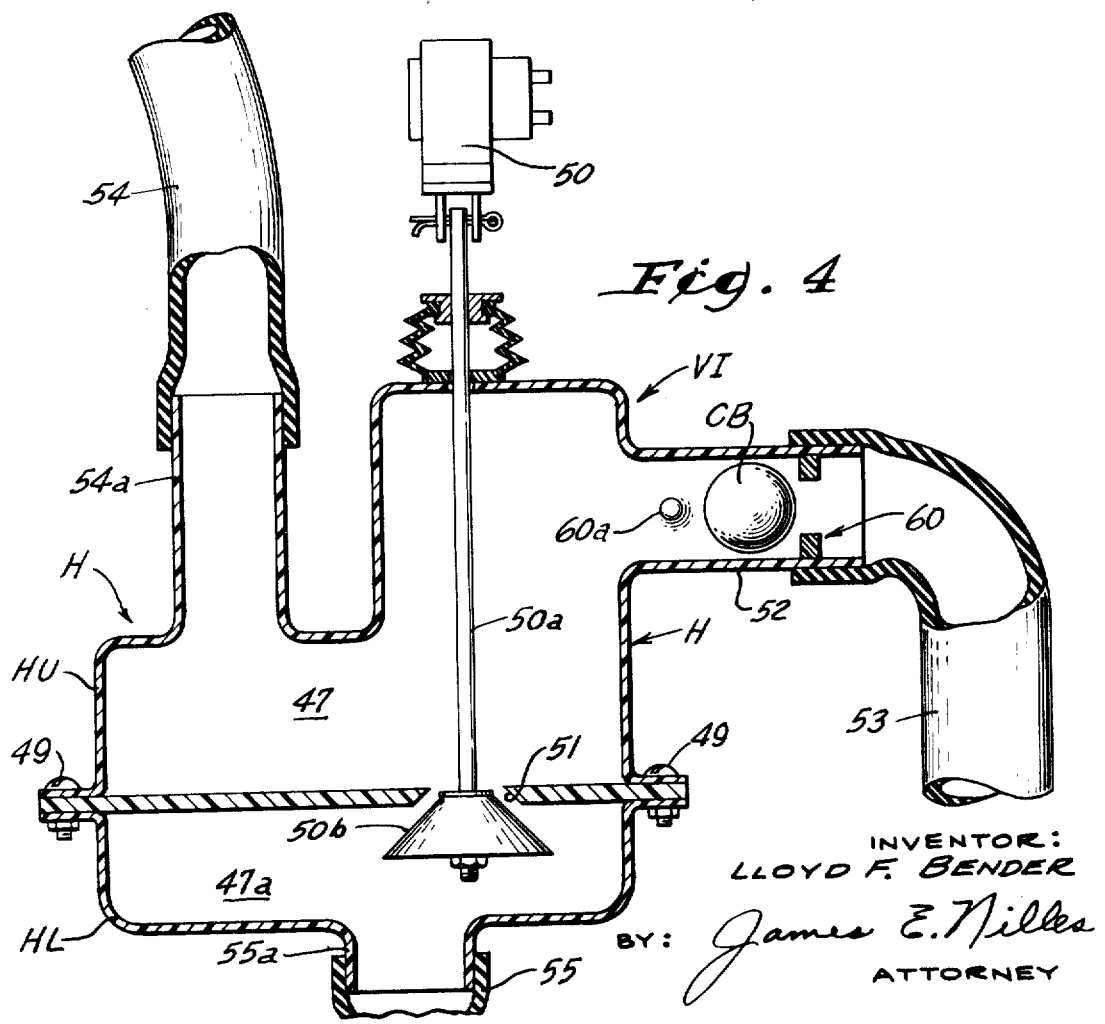
FIG. 4 is a cross sectional view of one of the two way valves shown in FIG. 1, but on an enlarged scale.

The housing H of the valve VI (FIG. 4) is preferably molded from plastic and is of two parts, a lower part HL and an upper part HU, each having outwardly extending flanges secured together by bolt means 49. A baffle plate 48 is located and held between the flanges of the housing parts. An upper chamber 47 and a lower chamber 47a are thus formed in the housing. A bevelled seat 51 extends through the plate 48. The intake valve VI is operated by a solenoid 50 (FIGS. 3 and 5), and returned by gravity. The solenoid shifts a rod 50a carrying a rubber, frustoconical, stopper 50b at its end, closing the valve by pulling the stopper against a seat 51.

The housing H has an upper nipple 52 to which is attached the conduit 53. This valve is of the two way type and its stopper 50b is shiftable so that (1) when stopper 50b is closed, it permits fluid from the tank T to be picked up in conduit 53 and conducted via conduit 54 to the flexible tubing FT to be cleaned; or (2) when stopper 50b is in an open position, then hot air can be blown from the dryer D which is driven by electric motor 57, through conduit 55 and into conduit 54 for drying the tubing FT.

The housing H has an intermediate height nipple 54a to which conduit 54 is connected, and also has a lowermost nipple 55a to which the dryer conduit 55 is connected.

Valve VI has a check ball CB in its side nipple 52 which can seated against the valve seat 60. Stop pin 60a is located on the side of seat 60 to hold the ball in proximity to the seat. The ball CB acts to close on seat 60 when the dryer is being used to dry the tubing, at which time the stopper 50b is in an open position, and dry air is forced out conduit 54 to dry the tubing FT.

The discharge valve VD is similar to valve VI except it does not have a check ball CB. Valve VD serves to return solution, which is received via line 17 and intermediate nipple 54b from the releaser vessel 1 to the tank T via its upper nipple 58 and conduit 58a (FIGS. 1 and 6), or it diverts or dumps fluid to a waste drain or the like via its lower nipple 59 and conduit 59a. The discharge valve is operated by a solenoid 61 which is energized by a cam 62 of the timer 29.

The timer 29 also has another cam 65 which, through coil 66 of a 40 ampere contactor 67, actuates the vacuum pump motor 11 and the timer 7 of the fluid circulating means FCM.

The 25 ampere contactor 51 controls the dryer D.

OPERATION

When it is desired to clean the flexible tubing FT without unwinding it from the portable tank cart 75 on which it is mounted, conduits 15 and 54 are connected to the flexible tubing at the quick detachable points 15a and 54a, respectively, to place it in communication with the fluid circulating means FCM and the intake valve VI. Alternatively, the flexible tubing can be connected directly to the washer-releaser and valve VI without the use of separate conduits 15 and 54.

The timer knob 77 is set to the "on" position and the tank fills with 95° water. After the tank is filled, the motor 11 will start to operate the fluid circulating means for a rinse cycle, say 5 minutes, the normally open intake valve VI permitting fluid from the tank T to flow to the flexible tubing. The discharge valve VD at this time diverts the rinse fluid to the drain. The drain stopper in the tank then is opened when the solenoid 27 is energized for say 3 minutes, to allow the tank to drain.

Solenoid 50 is then de-energized and valve VI shifts by gravity, and dryer motor 57 operates.

After the tank is emptied, solenoid 27 is de-energized and drain stopper 23 is then closed by spring 26 and the dryer D starts blowing hot air for a period, say 30 minutes, preset on the dryer timer DT. The tank T then fills with hot water mixed with detergent and the vacuum pump motor 11 then operates, for say, 10 minutes, to wash the tubing FT.

The drain stopper 23 then again opens the tank drain for 3 minutes to drain the tank T.

The drain stopper 23 is closed again by spring 26.

The tank T again fills to the set level with 95° water.

After the tank T is filled, the vacuum pump starts, and fluid circulating means FCM functions for a 5 minute rinse period.

After about 1 minute has elapsed in the rinse period, a measured amount of acid will be dispensed into the rinse solution.

The drain stopper then opens for 4 minutes.

The drain stopper closes and the dryer starts blowing warm air for the period preset on the dryer timer, and then it also stops.

I claim:

1. A system for automatically washing and drying fluid conduits, said system comprising, a fluid tank having an openable drain, drain closing means, supply means for supplying water to said tank, fluid circulating means in fluid receiving communication with a conduit to be washed and dried, a dryer for heating and blowing air; a two way intake valve connected to said conduit and when in one position being in fluid receiving communication with said tank whereby fluid from said tank is conducted through said conduit to wash the latter, said intake valve when in another position being in air receiving communication with said dryer whereby air is forced through said conduit to dry the latter; a two way discharge valve having a fluid receiving connection with said fluid circulating means and also having a discharge to said tank, whereby when said discharge valve is in one position fluid from circulating means is discharged into said tank, and when said discharge valve is in another position fluid from said circulating means is dumped; each of said two way valves comprising, a housing having an upper nipple, an intermediate nipple, and a lower nipple, baffle plate means in said housing and defining an upper chamber and a lower chamber therein, a shiftable control rod extending into said housing and having an inner end in said housing and an outer end outside of said housing, a stopper fixed on the inner end of said rod and engageable with said seat for sealing said lower chamber from said upper chamber, said upper nipple and said intermediate nipple being in fluid communication with said upper chamber and said lower nipple being in fluid communication with said lower chamber, and means for shifting said stopper between an open position in which said lower chamber communicates with said upper chamber and a closed position on said seat in which said lower chamber is not in communication with said upper chamber; and electrical control means including a timer, said control means operative to (1) actuate said water supply means to fill said tank, (2) actuate said fluid circulating means, (3) actuate said drain closing means, (4) shift the positions of said two way valves, and (5) actuate said dryer, all in timed sequence.

2. A system for automatically washing and drying fluid conduits, said system comprising, a fluid tank having an openable drain, drain closing means, supply means for supplying water to said tank, fluid circulating means in fluid receiving communication with a conduit to be washed and dried, a dryer for heating and blowing air; a two way intake valve comprising; a housing having an upper nipple, an intermediate nipple, and a lower nipple, baffle plate means in said housing and defining an upper chamber and a lower chamber therein, a shiftable control rod extending into said housing and having an inner end in said housing and an outer end outside of said housing, a stopper fixed on the inner end of said rod and engageable with said seat for sealing said lower chamber from said upper chamber, said upper nipple and said intermediate nipple being in fluid communication with said upper chamber and said lower nipple being in fluid communication with said lower chamber, said stopper being shiftable between an open position in which said lower chamber communicates with said upper chamber and a closed position on said seat in which said lower chamber is not in communication with said upper chamber; said intermediate nipple having a fluid connection with said conduit to be washed and dried, said upper nipple having a fluid receiving communication with said tank whereby fluid from said tank is conducted through said conduit to wash the latter, said lower nipple having an air receiving communication with said dryer whereby air is forced through said conduit to dry the latter, a two way discharge valve having a fluid receiving connection with said fluid circulating means and when said discharge valve is in one position fluid from circulating means is discharged into said tank, and when said discharge valve is in another position fluid from said circulating means is dumped; and electrical control means including a timer, said control means operative to (1) actuate said water supply means to fill said tank, (2) actuate said fluid circulating means, (3) actuate said drain closing means, (4) shift the positions of said two way valves, and (5) actuate said dryer, all in timed sequence.

3. The system set forth in claim 2 further characterized in that said two way discharge valve comprises; a housing having an upper nipple, an intermediate nipple, and a lower nipple, baffle plate means in said housing and defining an upper chamber and a lower chamber therein, a shiftable control rod extending into said housing and having an inner end in said housing and an outer end outside of said housing, a stopper fixed on the inner end of said rod and engageable with said seat for sealing said lower chamber from said upper chamber, said upper nipple and said intermediate nipple being in fluid communication with said upper chamber and said lower nipple being in fluid communication with said lower chamber, said stopper being shiftable between an open position in which said lower chamber communicates with said upper chamber and a closed position on said seat in which said lower chamber is not in communication with said upper chamber, said upper nipple having said fluid receiving communication with said circulating means, said lower nipple dischargeable into said tank, and said intermediate nipple open to dump said fluid.

* * * * *